United States Patent [19]

Theysohn et al.

[11] 4,146,528

[45] Mar. 27, 1979

[54] THERMOPLASTICS, REINFORCED WITH GLASS FIBER MATS, WHICH POSSESS IMPROVED RIGIDITY

[75] Inventors: Rainer Theysohn, Ludwigshafen; Martin Welz, Bad Duerkheim; Rolf Wurmb, Heidelberg, all of Fed. Rep. of Germany

[73] Assignee: BASF Aktiengesellschaft, Ludwigshafen, Fed. Rep. of Germany

[21] Appl. No.: 874,143

[22] Filed: Feb. 1, 1978

[30] Foreign Application Priority Data

Mar. 2, 1977 [DE] Fed. Rep. of Germany ....... 2708905

[51] Int. Cl.$^2$ ............................ C08K 7/00; C08K 7/14
[52] U.S. Cl. ............... 260/40 R; 260/42.18; 428/241; 428/285
[58] Field of Search ............... 428/241, 285; 260/42.18, 40 R

[56] References Cited

U.S. PATENT DOCUMENTS

| 2,517,753 | 8/1950 | Ximenez et al. ............... 428/241 X |
| 3,863,758 | 2/1975 | Connelly ....................... 260/42.18 X |
| 4,044,188 | 8/1977 | Segal ............................ 428/285 X |

*Primary Examiner*—Sandra M. Person
*Attorney, Agent, or Firm*—Keil & Witherspoon

[57] ABSTRACT

Thermoplastics reinforced with glass fiber mats contain from 10 to 60% by weight of such mats and from 5 to 60% by weight of a finely divided inert filler, the sum of the percentages by weight of glass fiber mats and filler being not greater than 70% by weight. The inert filler is a talc, having a foliated crystalline structure, which has a mean flake thickness of not more than 5 $\mu$m and a ratio of mean flake diameter to mean flake thickness of from 5:1 to 500:1. When processing the thermoplastic filled with talc and glass fiber mats, homogeneous impregnation of the glass fiber mats with the filled thermoplastic is achieved.

4 Claims, No Drawings

THERMOPLASTICS, REINFORCED WITH GLASS FIBER MATS, WHICH POSSESS IMPROVED RIGIDITY

The present invention relates to thermoplastics which are reinforced with glass fiber mats and contain fillers, and which contain (a) from 10 to 60 percent by weight of glass fiber mats weighing from 250 to 1,200 g/m² and (b) from 5 to 60 percent by weight of a finely divided inert filler, the percentages by weight of (a) and (b) being based on the thermoplastics including (a) and (b) and their sum being not more than 70 percent by weight.

Such thermoplastics reinforced with glass fiber mats constitute plastics which have substantially improved rigidity — as a result of the reinforcement — compared to non-reinforced plastics.

Thermoplastics reinforced with glass fiber mats, and rods, tubes and sheets made from thermoplastics reinforced with glass fiber mats can be manufactured continuously in accordance with the process disclosed in German Published Application DAS No. 2,312,816 by extruding a thermoplastic melt through a slot die between preheated glass fiber mats and then pressing the composition and cooling it under pressure. The lower is the viscosity of the melt, the easier it is to impregnate the glass fiber mats therewith. Using this conventional process, pore-free sheets, tubes, panels, strips, rods, profiles and the like can be manufactured.

For a plurality of applications, thermoplastics which contain fillers and reinforcing agents are employed, the said additives serving, for example, to increase the modulus of elasticity and the tensile strength, to reduce the shrinkage and the coefficient of thermal expansion or to cheapen the composition. If the composition is injection-molded, or used to extrude rods, tubes or sheets, the increase in viscosity due to the fillers can in part be compensated for by using a higher processing pressure.

For the manufacture of thermoplastics reinforced with glass fiber mats it would also be desirable to employ thermoplastics containing fillers, for example in order to increase the modulus of elasticity yet further and reduce the shrinkage, without having to increase the proportion of relatively expensive glass fiber mats. A precondition is that the mats should be impregnated thoroughly — in the main as a result of the good flow of the melt containing the fillers — and that the rods, tubes and sheets should have a flawless surface, without glass fibers protruding from the surface.

However, it has been found that in the case of a large number of fillers, such as short glass fibers, quartz flour, wollastonite, gypsum, aluminum hydroxide, chalk, mica or kaolin, phase separation occurs as a result of the filtering action of the glass mats. Furthermore, above all at filler contents exceeding 10 percent by weight, the flow of the thermoplastic melt is reduced to the point that satisfactory impregnation of the glass fiber mats, and hence uniform distribution of the fillers over all parts of the thermoplastic, is no longer achieved. Even in the case of thin sheets, this situation results in a rough and wavy surface; in the case of thick sheets, the melt entirely fails to penetrate through the glass fiber mats as far as the opposite surface.

It is an object of the present invention to provide a thermoplastic/filler combination which does not exhibit the above disadvantages when converted to rods, tubes and sheets of thermoplastics reinforced with glass fiber mats and which gives flawless products of the said type which possess high rigidity, reduced distortion and/or shrinkage and a smooth surface.

We have found that this object is achieved, according to the invention, by using, as the filler (b), a talc, having a foliated crystalline structure, which has a mean flake thickness of not more than 5 $\mu$m and a ratio of mean flake diameter to mean flake thickness of from 5:1 to 500:1.

Preferably, the mean flake thickness is not greater than 2 $\mu$m and the ratio of mean flake diameter to mean flake thickness of the talc is from 20:1 to 200:1.

The advantage achieved by means of the invention is in particular that when processing the talc-filled thermoplastic to give rods, tubes and sheets of plastic reinforced with glass fiber mats, in accordance with the process described in German Published Application DAS No. 2,312,816, the filled thermoplastic homogeneously impregnates the glass fiber mats.

Thermoplastics means the solid synthetic high molecular weight materials which, on raising the temperature, become soft when their softening point has been exceeded, and become hard again on cooling. In industry, this sequence is utilized for the manufacture of rods, tubes and sheets, and of finished articles, by extruding, injection-molding, thermoforming and other processes. Thermoplastics which are particularly suitable for the purposes of the invention are polyethylene having a density of from 0.890 to 0.965 g/cm³ (measured according to DIN 53,479) and a melt index of from 0.1 to 20 g/10 min (measured according to ASTM D 1238-65 T at 190° C. under a load of 2.16 kp), nylon 6 and nylon 6,6, and poly(ethylene terephthalate) and poly(butylene terephthalate) having K values of from 50 to 80, preferably from 60 to 75 (measured by the method of H. Fikentscher, Cellulosechemie 13 (1932), 58, at 25° C., at a concentration of 0.5 g in 100 ml of 98% strength sulfuric acid in the case of the nylons or of 0.5 g in 100 ml of a 3:2 phenol/o-dichlorobenzene mixture in the case of poly(ethylene terephthalate) and poly(butylene terephthalate).

Glass fiber mats means textile sheets consisting of glass fibers. The length of the glass fibers may vary from 10 mm to infinite (continuous) length. To ensure better cohesion, the glass fibers are advantageously coated with conventional binders based on synthetic resins. In addition, they may contain silane-based or chromium-based or titanium-based adhesion promoters. Loose glass fiber mats weighing from 250 to 1,200, preferably from 300 to 600, g/m² are used. In addition, the glass fiber mats can be covered with facing mats, weighing from 20 to 60 g/m², of glass fibers. The ratio of thermoplastic to glass fiber mats is selected so that the rods, tubes and sheets produced contain from 10 to 60 percent by weight, preferably from 15 to 40 percent by weight, of glass fibers, based on the thermoplastic containing fillers and reinforced with glass fiber mats. It is possible to use only one mat impregnated with the plastic melt, or to use several superposed impregnated mats.

In addition to the glass fiber mats, the thermoplastic contains from 5 to 60, preferably from 10 to 40, percent by weight of a finely divided inert filler, based on the amount by weight of the plastic containing filler and reinforced with glass fiber mats. However, the sum of the percentages by weight of glass fiber mat and inert finely divided filler should not be greater than 70 percent by weight, based on the amount by weight of the thermoplastic containing filler and reinforced with glass fiber mats. Accordingly, the thermoplastic rods, tubes and sheets contain at least 30 percent by weight of the thermoplastic, preferably from 50 to 70 percent by weight.

The essential characteristic of the invention is that the finely divided inert filler is a talc having a foliated crystalline structure which has a mean flake thickness of not more than 5 μm, preferably 2 μm, more preferably 1 μm, and a ratio of mean flake diameter to mean flake thickness, ie. a mean side ratio, of from 5:1 to 500:1, preferably from 20:1 to 200:1.

The finely divided talc used according to the invention can be surface-treated. In that case, it is possible to employ the conventional silane-based, chromium-based or titanium-based adhesion promoters for glass fibers, but coatings with compounds which bring about compatibility, e.g. stearates, waxes or film-forming polymers, may also be employed. Preferably, however, the talc used has not been surface-treated.

The rods, tubes and sheets of the thermoplastic containing filler and reinforced with glass fiber mats are manufactured by the process described in German Published Application DAS 2,312,816, a talc-containing thermoplastic melt being used instead of the unfilled thermoplastic melt.

EXAMPLES 1 AND 2

A mixture of 70 parts by weight of polyethylene having a density of 0.96 g/cm$^3$ and a melt index of 5 g/10 min, and 30 parts of talc having a mean side ratio of about 50 and a mean flake thickness of 3 μm, together with the conventional stabilizing and lubricant additives, is extruded through a slot die between two preheated glass fiber mats each weighing 600 g/m$^2$. The composite material is then pressed, and cooled, as described in German Published Application DAS No. 2,312,816. The material is 3.2 mm thick and has smooth surfaces. The measurements shown in the Table were obtained on samples taken from the sheet obtained. For comparison, sheets of unfilled polyethylene containing the same glass fiber mat reinforcement were manufactured. The test results are shown in the 2nd column of the Table.

| Experiment | Proportion of glass fiber mats in % by weight | Proportion of filler in % by weight | Modulus of elasticity N/mm$^2$ | Tensile strength N/mm$^2$ |
| --- | --- | --- | --- | --- |
| 1 | 23 | 23 | 7,390 | 62 |
| 2 | 31 | — | 5,000 | 54 |

COMPARATIVE EXAMPLE 70 parts by weight of polyethylene having a density of 0.96 g/cm$^3$, and 30 parts by weight of quartz powder having a particle diameter of <5μ are mixed and converted to sheets using two glass mats weighing 600 g/m$^2$ each, and employing the process described in Example 1. Tests carried out on the products obtained gave a modulus of elasticity of 5,600 N/mm$^2$ and a tensile strength of 52 N/mm$^2$. The surface exhibited substantial roughness and protruding glass fibers.

We claim:

1. A composition of matter consisting of a thermoplastics material, glass fiber mats and a finely divided inert filler said thermoplastic material having (a) from 15 to 40 percent by weight of glass fiber mat weighing from 250 to 1,200 g/m$^2$ as reinforcement and further having (b) from 5 to 60 percent by weight of finely divided inert filler, the percentages by weight of (a) and (b) being based on the composition and their sum being not more than 70 percent by weight, wherein the filler (b) is a talc, having a foliated crystalline structure, which has a mean flake thickness of not more than 5μ and a ratio of mean flake diameter to mean flake thickness of from 5:1 to 500:1.

2. A composition as set forth in claim 1, wherein the mean flake thickness of the talc is not more than 2μ.

3. A composition as set forth in claim 1, wherein the ratio of mean flake diameter to mean flake thickness of the talc is from 20:1 to 200:1.

4. A composition as set forth in claim 3, wherein the mean flake thickness of the talc is not more than 1μ.

* * * * *

UNITED STATES PATENT AND TRADEMARK OFFICE
CERTIFICATE OF CORRECTION

PATENT NO. : 4,146,528
DATED : March 27, 1979
INVENTOR(S) : Theysohn et al

It is certified that error appears in the above-identified patent and that said Letters Patent are hereby corrected as shown below:

IN THE CLAIMS:

Claim 1, line 34, "5μ" should be --- 5 μm ---.

Claim 2, line 38, "2μ" should be --- 2 μm ---.

Claim 4, line 42, "1μ" should be --- 1 μm ---.

Signed and Sealed this

Fourth Day of December 1979

[SEAL]

*Attest:*

SIDNEY A. DIAMOND

*Attesting Officer*   *Commissioner of Patents and Trademarks*